United States Patent [19]

Bowen, III

[11] Patent Number: 4,838,012

[45] Date of Patent: Jun. 13, 1989

[54] VEGETABLE HARVESTER

[76] Inventor: Perry G. Bowen, III, P.O. Box 1949, Prince Frederick, Md. 20678

[21] Appl. No.: 44,439

[22] Filed: Apr. 30, 1987

[51] Int. Cl.⁴ .......................................... A01D 46/00
[52] U.S. Cl. ..................................... 56/13.1; 56/12.8
[58] Field of Search ..................... 56/13.1, 13.2, 12.8, 56/12.9

[56] References Cited

U.S. PATENT DOCUMENTS 3,855,760  12/1974  Smith, Jr. et al. .................... 56/13.2
4,723,400  2/1988  Williames ............................. 56/13.1

Primary Examiner—Stephen F. Husar
Attorney, Agent, or Firm—Sughrue, Mion, Zinn, Macpeak, and Seas

[57] ABSTRACT

A vegetable harvester of the type adapted to be mounted on a tractor locates the cutting mechanism, the pneumatic transport system and a collection box on a common frame which is movable vertically relative to the tractor on which it is mounted to adjust the height of the cutting blade and to raise the collection box to a height whereby the contents may be discharged through a bottom opening into a larger receptacle. The common frame is mounted on a telescopic slide frame which in turn is pivotally mounted at its lower end to the conventional three point hitch of a tractor whereby the telescopic frame and the common frame during the cutting mechanism may be tilted relative to the vertical to adjust the angle of the cutting mechanism relative to the ground.

4 Claims, 4 Drawing Sheets

VEGETABLE HARVESTER

FIELD OF THE INVENTION

The present invention is directed to a vegetable harvester of the type adapted to be mounted on a tractor, more specifically, to a vegetable harvester wherein the cutting mechanism, the pneumatic transport system, and a collection box are all mounted on a common frame which is movable vertically relative to the tractor on which it is mounted to adjust the height of the cutting blade and to raise the collection box to a height whereby the contents may be discharged through a bottom opening into a larger receptacle.

BACKGROUND OF THE INVENTION

In harvesting vegetables, it is desirable to harvest the vegetables without bruising, breaking or tearing the vegetables so that they will be acceptable for market. Most vegetables in their marketable state are very tender, easily bruised, broken and torn, and therefore may be severely damaged in value or rendered worthless by rough handling. Existing machinery to harvest such crops for the canning, packing or processing market leaves the crops in a condition generally unacceptable to buyers for fresh market use and unable to compete with similar crops harvested by hand. However, automatic machinery for harvesting vegetables is necessary and desirable due to the size of the operation and location of the crops wherein it is impossible to obtain the labor necessary to harvest the crops by hand.

In prior vegetable harvesters, the use of pneumatic conveyors from the cutting mechanism to a container is well known, as evidenced by the patent to Smith et al (U.S. Pat. No. 3,855,760). However, in the patent to Smith the harvested crop which is conveyed through a pneumatic tube, is deposited directly onto a conveyor for subsequent elevation and discharge into a container mounted on the rear of the harvester vehicle. This additional handling of the crop tends to create additional damage to the crop thereby reducing the value of the crop. Although the stripping reels of Smith et al are vertically adjustable and although the container may be elevated for the purpose of dumping the crop from the container into a larger container by means of a tipping operation, the mechanisms for carrying out these operations are completely independent of each other.

SUMMARY OF THE INVENTION

The present invention provides a new and improved vegetable harvester which minimizes the handling of the harvested vegetables and thereby reduces the amount of damage to the vegetables.

The present invention provides a new and improved vegetable harvester wherein the container for receiving the harvested vegetables is mounted on the same frame with the cutter mechanism and the pneumatic transport system, whereby the same mechanism can be used for adjusting the height of the cutter mechanism and for discharging the vegetables from the collection box.

The present invention provides a new and improved vegetable harvester comprising a frame adapted to be pivotably mounted on a conventional three-point tractor hitch for vertical and tilting adjustment relative to the tractor, a slide mounted on said frame for vertical movement relative thereto, first drive means mounted on said frame for moving said slide relative to said frame, a substantially closed rectilinear container having a top, four sides and a bottom pivoted on one of said sides for pivotal movement into open and closed relation with said sides, connection means for detachably connecting said container to said slide whereby said container may be raised and lowered with said slide relative to said frame, support means secured to one side of said container and adapted to extend forwardly along one side of said tractor, cutting means mounted on the forward end of said support means, conduit means having one end disposed adjacent said cutting means and the opposite end thereof disposed in communication with the interior of said container, blower means mounted on the top of said container and disposed in communication with the interior of said container at a point remote from the connection of said conduit with said container, and means found on said container for pivoting said bottom of said container to open and close the bottom of said container.

The foregoing and other objects, features and advantages of the present invention will be apparent from the following, more particular description of a preferred embodiment of the invention as illustrated in the accompanying drawings.

DETAILED DESCRIPTION OF THE INVENTION

Figure 1:
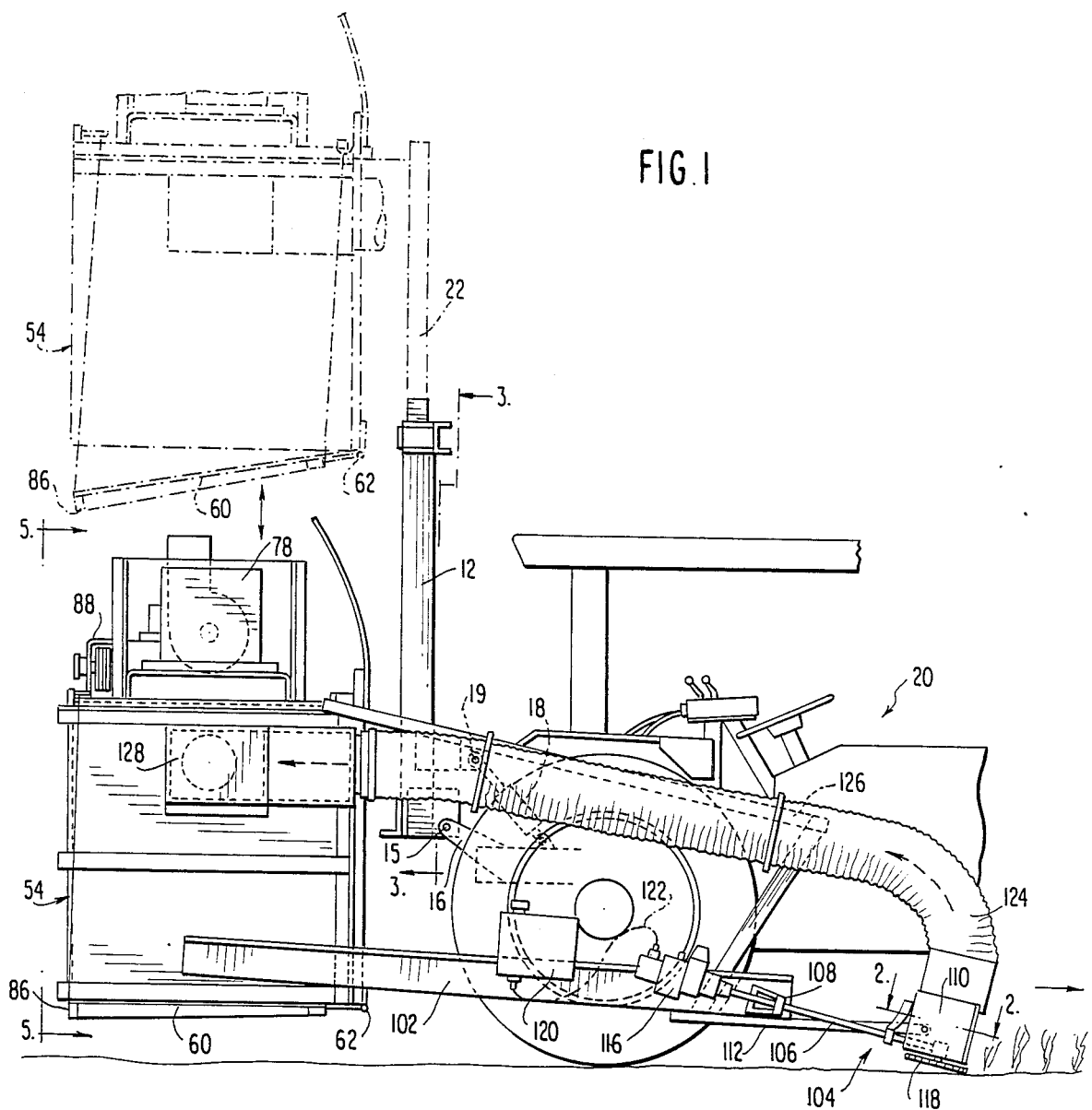
FIG. 1 is a side elevational view of the vegetable harvester mounted on a three-point tractor hitch with the cutting means and container shown in solid lines in the harvesting position, and the container shown in phantom lines with the cutting means broken away in the raised discharge position.
Figure 6:
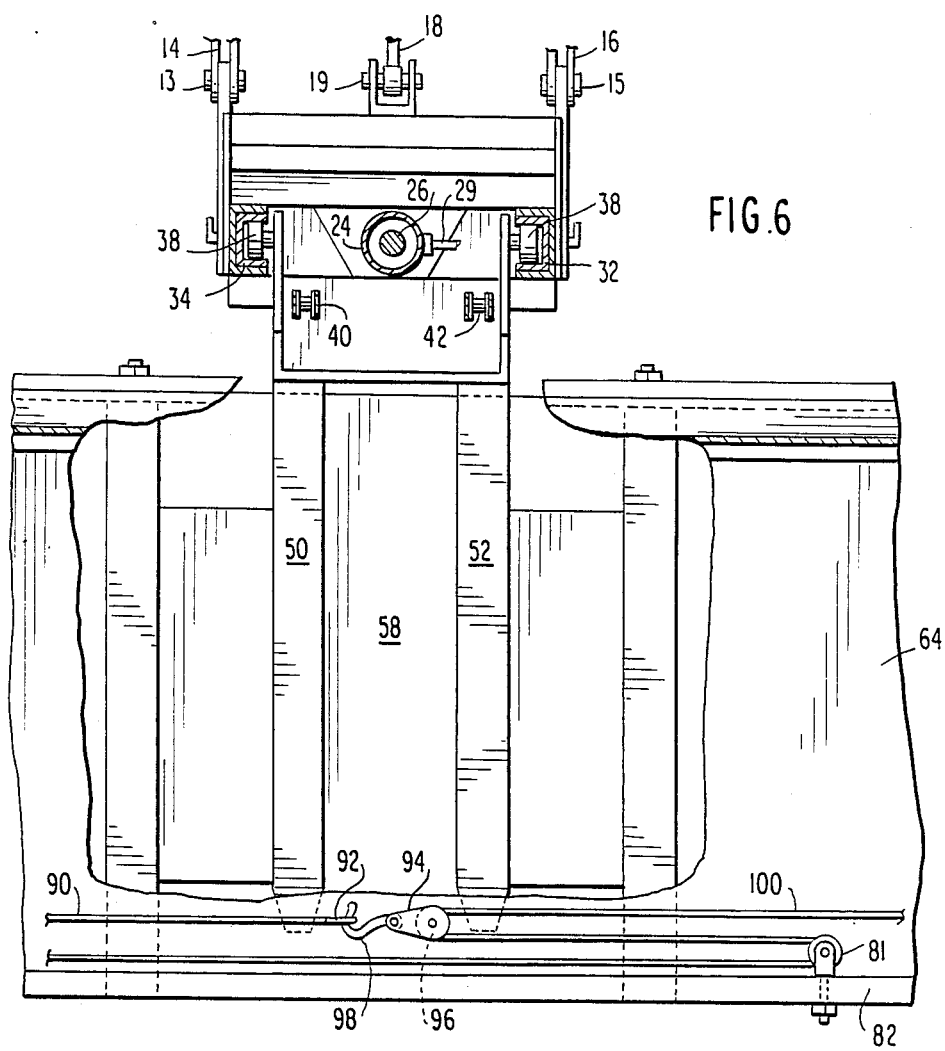
FIG. 6 is a fragmentary plan view of the harvester, partly in section, and taken substantially along the line 6—6 of FIG. 5.
Figure 7:
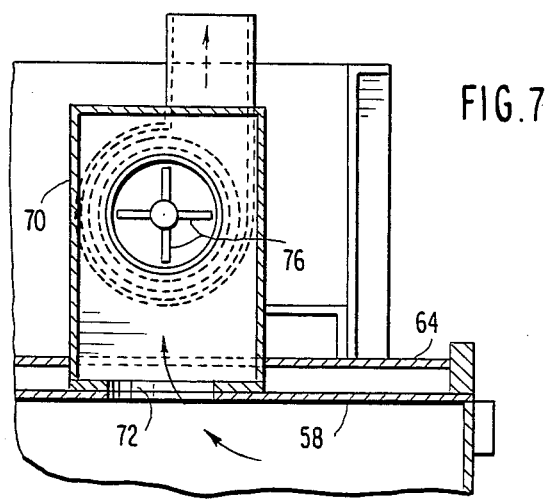
FIG. 7 is a fragmentary vertical sectional view taken along the line 7—7 of FIG. 5, showing the direction of air flow out of the harvester.

The vegetable harvester 10 according to the present invention is shown in FIG. 1 mounted on the three-point hitch of a conventional tractor 20. The harvester 10 is comprised of a vertically-extending rectilinear frame or mast 12 which is pivotally connected to the arms 14 and 16 of the three-point hitch by means of pivot pins 13 and 15 as shown in FIGS. 1 and 6. The hydraulic piston and cylinder assembly 18 of the three-point hitch is also connected to the frame 12 at a location above the pivot pin 15 by means of a separate pivot pin 19. A slide 22 is telescopically mounted for vertical sliding movement within the frame 12 for movement between the solid line position shown in FIGS. 1 and 3, and the elevated position illustrated in phantom lines. An hydraulic cylinder 24 having a telescopic piston 26 is mounted on the transversely extending base 27 of the frame 12 with the upper end of the piston rod 26 pivotally connected to the upper end of the slide 22 at 28. The hydraulic cylinder 24 may be connected to the hydraulic system on the tractor by means of conduits 29 connected to the upper and lower ends of the cylinder 24 for raising and lowering the piston rod 26 and the slide 22 connected thereto.

Figure 3:
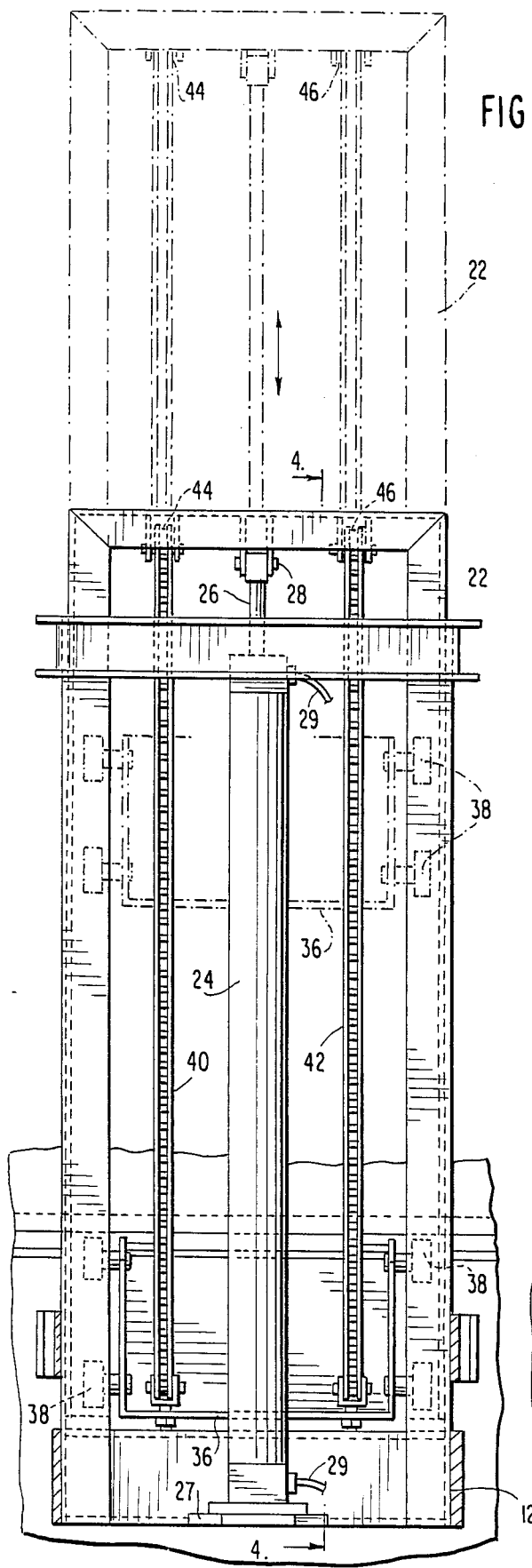
FIG. 3 is an enlarged fragmentary vertical elevational view of the frame and slide assembly taken on the line 3—3 of FIG. 1 with the slide shown in phantom lines in the extended position thereof.
Figure 4:
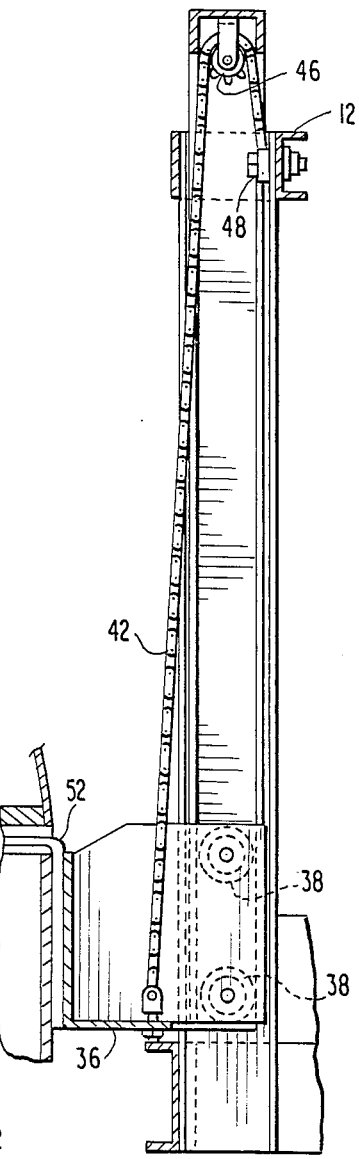
FIG. 4 is a fragmentary vertical sectional view of the frame and slide assembly of FIG. 3, taken along the line 4—4 thereof.

The slide 22 is provided with a pair of opposed U-shaped channels 32 and 34 at opposite sides thereof, and a container supporting frame 36 having a plurality of rollers 38 disposed in said channels 32 and 34 is mounted for vertical movement relative to the slide 22. A pair of chains 40 and 42 are connected at one end to the container supporting frame 36 and extend about a pair of sprocket wheels 44 and 46 rotatably connected to the upper end of the slide 22 and are secured to the upper end of the frame 12 by means of a nut and bolt assembly 48. Thus, upon movement of the slide 22 from the solid line position to the raised dotted line position as shown in FIG. 3, the container supporting frame 36 will be raised from the solid line position to the dotted line position in FIG. 3.

The container supporting frame 36 is provided with a pair of laterally projecting forks 50, 52 detachably engaging and supporting a container box 54 as shown in FIGS. 1, 4, 5 and 6. The container box 54 is a substantially closed rectilinear structure having four sides 56, a top 58, and a bottom 60, pivoted to one side 56 at 62. The cover member 64 is secured in spaced-apart relation to the top wall 58 of the container whereby the fork members may be inserted between the cover member 64 and the top wall 58 to detachably engage and support the container 54. A plenum chamber 70 is mounted on the top wall 58 of the container and an aperture 72 extends through the top wall 58 and the bottom of the plenum chamber 70 to place the interior of the plenum chamber into communication with the interior of the container. An impeller unit 74 is mounted on the cover member 64 and is provided with a rotatable blade 76 which is driven by an internal combustion engine 78 which is mounted on the cover member 64 adjacent the impeller unit 74. The conduit 80 provides communication between the interior of the plenum chamber and the interior of the impeller unit whereby, upon operation of the engine 78, the blade 76 will be rotated to produce a flow of air through the container 56, the plenum chamber 70, the conduit 80 and the impeller unit 74, as indicated by the dashed arrows in FIG. 5. A fuel tank 80 is also mounted on the cover member 64 adjacent the internal combustion engine 78 for providing a supply of fuel to the internal combustion engine 78 through a suitable conduit (not shown).

Figure 5:
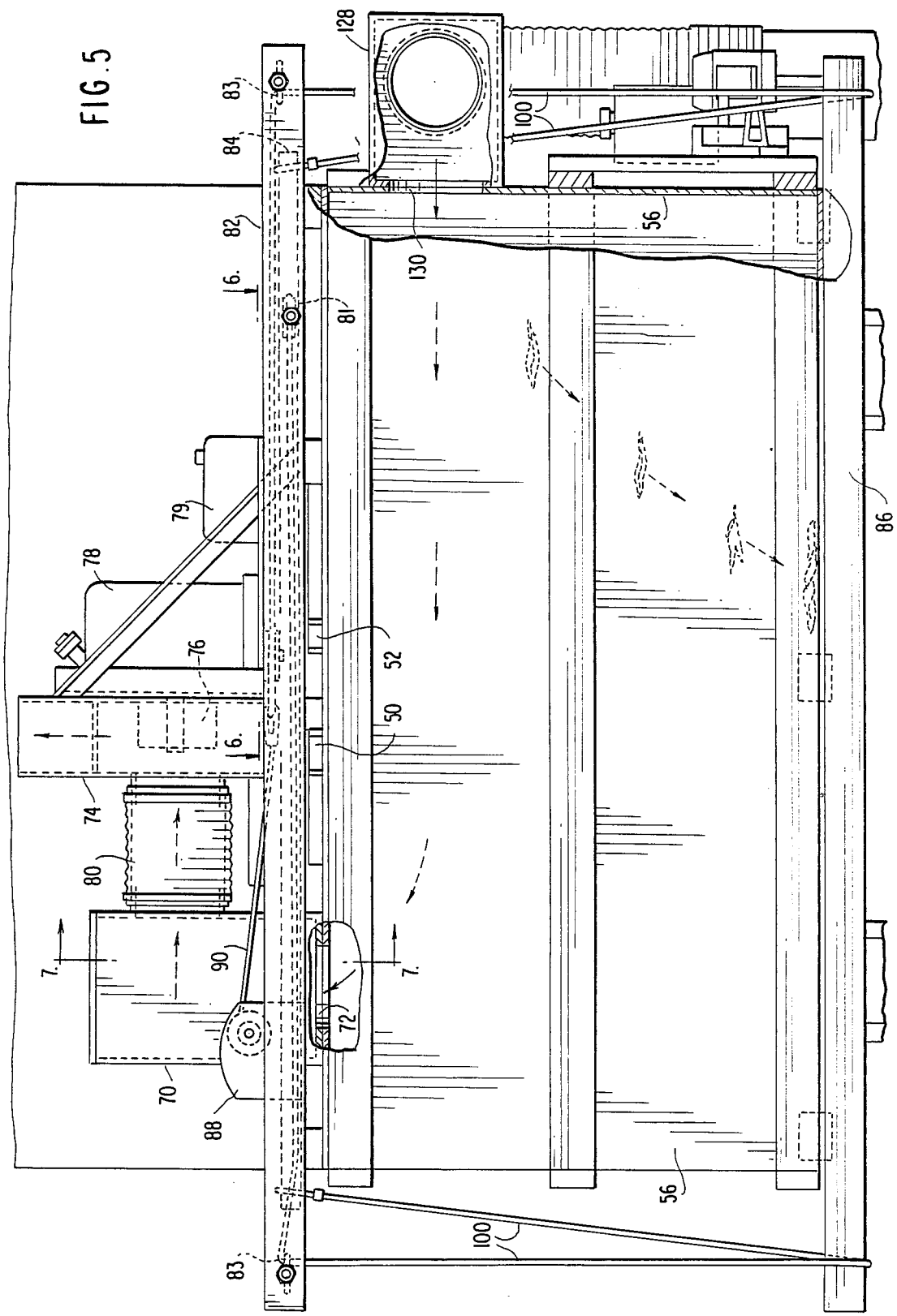
FIG. 5 is an enlarged fragmentary end elevational view, partly in section, taken on the line 5—5 of FIG. 1, showing the direction of travel of the air stream and crop and the winch and cable assembly for operating the bottom door of the container.

An elongated beam 82 is secured to the upper surface of the cover member 64 and extends beyond opposite sides of the box 54 as shown in FIG. 5. A pair of eyelets 83 are mounted at opposite ends of the beam 82 and a pulley 81 is secured to the beam intermediate the ends thereof. A similar beam 84 is also secured to the upper surface of the cover member 64 parallel to the beam 82. The opposite ends of the beam 84 also extend beyond the opposite sides of the box 54. A third beam 86 is secured to the edge of the bottom wall 60 opposite and parallel to the pivotal connection 62. Opposite ends of the beam 86 also extend beyond the opposite end walls of the container 54. A motor driven winch 88 is mounted on the upper surface of the cover member 64 and is provided with a cable 90 and eyelet 92 secured to an end thereof. Tackle block 94 having a pulley 96 is provided with a hook 98 which is disposed in engagement with the eyelet 92. A cable 100 is secured to one end of the beam 84 and extends downwardly about one projecting end of the beam 86, upwardly through the eyelet 83 secured to one end of the beam 82, over the pulley 96, around the pulley 81, through the eyelet 83 at the other end of the beam 82, downwardly about the other end of the beam 86 and upwardly where the opposite end of the cable is secured to the other projecting end of the beam 84. Thus, upon operation of the winch 88 to retract the winch cable 92, the cable 100 will draw the beam 86 connected to the bottom wall 60 of the container upwardly so that the bottom wall of the container will be disposed in the closed position as shown in the solid line position in FIG. 1 and as shown in FIG. 5.

Figure 2:
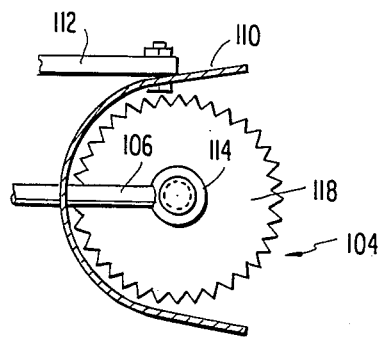
FIG. 2 is an enlarged fragmentary horizontal sectional view showing the open end of the header and the cutter means taken on the line 2—2 of FIG. 1.

The forwardly extending cutter supporting frame is secured to one side of the container 54. The cutter supporting frame is comprised of a beam 102 connected to one side of the container adjacent the lower edge thereof and extending forwardly so as to be disposed adjacent the large rear wheels of a conventional tractor. A cutter assembly 104 is mounted on the forward end of the beam 102 and is comprised of a hollow shaft housing 106 supported by a bracket 108. A U-shaped deflector 110 is mounted at the forward end of a support bar 112 which is secured to the forward end of the beam 108. The shaft housing 106 is connected to and supports a gear box 114 within the deflector 110 as best shown in FIG. 2. An internal combustion engine 116 is mounted on the support beam 102 having a drive shaft (not shown) which extends through the shaft housing 106 to drive the gears (not shown) within the gear housing 114 to drive the cutter 118 secured thereto. A fuel tank 120 is also mounted on the support beam 102 and supplies gasoline to the internal combustion engine 116 through a conduit 122. Thus, upon operation of the internal combustion engine 116, the cutter blade 118 will be rotated to sever the vegetables adjacent the ground as shown in FIG. 1.

A flexible conduit 124 is supported by a frame 126 which is connected at opposite ends to the container 54 and the support beam 102. One end of the flexible conduit 124 extends over the top of the deflector 110 and the opposite end of the conduit 124 is secured to an input chamber 128 secured to the side 56 of the container. An aperture 130 is provided through the side wall 56 of the container and the inlet chamber 128 to communicate the inlet chamber 128 with the interior of the container 54.

Since the cutter assembly 104 and the conduit 124 are mounted directly on the container 54, the entire assembly is moved vertically upon movement of the container support frame 36. Thus, the height of the cutting blade relative to the ground can be adjusted by operation of the hydraulic piston and cylinder assembly 26, 24 which raises and lowers the slide 22 relative to the frame 12. If it is necessary to change the angle of the blade, that is the plane in which the blade rotates relative to the ground, the main frame 12 may be pivoted about the pivot pins 13 and 15 by means of the hydraulic cylinder assembly 18.

In the operation of the vegetable harvester, the impeller 72 is driven by the motor 78 to create a flow or air through the conduit 124, the container 54, the plenum chamber 70 and the conduit 80. The flow of air will cause the leaves of the individual vegetable plants to be lifted from the ground to facilitate the severing of the leaves from the plant by means of the rotating cutter blade 118. The severed leaves will be drawn through the conduit 124 and since the air stream within the container 54 reverses substantially the entire width of the container, the leaves will be deposited fairly uniformly across the width of the container as shown in FIG. 5. When the container is full, the rotation of the cutter blade and the operation of the impeller unit are discontinued.

The tractor is then driven to a collection area wherein a large bin or open top trailer is provided for receiving the contents of the container 54. The container 54 is raised to the elevated position as shown in FIG. 1 and the tractor is maneuvered to locate the container 54 directly over the larger collection receptacle (not shown). The winch 88 is then operated to lower the bottom wall or door 60 of the container 54, thereby discharging the cut vegetables into the larger container. The winch is then operated in the opposite direction to close the door. The container 54 may then be lowered to press the cut vegetables downwardly into the receptacle into which they have been unloaded. The wall of the receptacle would be disposed between the container 54 and the frame 12 and not interfere with such an operation. After the tamping or compressing operation, the container 54 would again be raised, the tractor moved away from the receptacle and the container lowered into the solid line position as shown in FIG. 1.

Multiple headers, including cutting mechanisms and conduits, may be attached to the same container if multiple row capacity is desired. The severing blades may be driven by an electric motor or a hydraulic motor, as well as by the gasoline powered internal combustion engine in the illustrated embodiment.

While the invention has been particularly shown and described with reference to a preferred embodiment thereof, it will be understood by those in the art that various changes in form and detail may be made therein without departing from the spirit and scope of the invention.

What is claimed is:

1. A vegetable harvester comprising
    a frame adapted to be pivotally mounted on a conventional three point tractor hitch for vertical and tilting adjustment relative to the tractor,
    a slide mounted on said frame for vertical movement thereon,
    first drive means mounted on said frame for moving said slide relative to said frame,
    a substantially closed rectilinear container having a top, four sides and a bottom pivoted on one of said sides for pivotal movement into open and closed relation with respect to said side,
    connection means for detachably connecting said container to said slide whereby said container may be raised and lowered with said slide relative to said frame,
    support means secured to one side of said container and adapted to extend forwardly along one side of said tractor,
    cutting means mounted on a forward end of said support means,
    conduit means having one end disposed adjacent said cutting means and the opposite end thereof disposed in communication with the interior of said container,
    blower means mounted on the top of said container and disposed in communication with the interior of said container and
    means on said container for moving said bottom of said container to open and close the bottom of said container.

2. A vegetable harvester as set forth in claim 1, wherein said lower means is disposed in communication with the interior of said container at a point remote from the connection of said conduit with said container to facilitate uniform distribution of cut vegetables within said container.

3. A vegetable harvester as set forth in claim 1, wherein said cutter means is comprised of a rotating cutter disk, deflector means mounted on said support means and disposed in partially surrounding relation to said cutter disk with said one end of said conduit means fitted over said deflector to facilitate positioning of said vegetables for cutting and subsequent entry into said conduit means.

4. A vegetable harvester as set forth in claim 1, wherein said means for moving said bottom of said container is comprised of a winch mounted on said container and cable means upwardly connected between said winch and said bottom to raise and lower said bottom into and out of engagement with said sides.

* * * * *